United States Patent
Vopat et al.

[11] 3,864,778
[45] Feb. 11, 1975

[54] CHALK ERASER MADE FROM CLOSED CELL FOAM PLASTIC

[76] Inventors: Frank E. Vopat, 809 Woodcliff Dr., South Bend, Ind. 46615; Stephen L. Colucci, 1203 Hillcrest Rd., South Bend, Ind. 44617

[22] Filed: Aug. 18, 1972

[21] Appl. No.: 281,714

[52] U.S. Cl. ................................. 15/105, 15/244 R
[51] Int. Cl. ............................................. B43l 21/00
[58] Field of Search ......... 15/118, 244, 105; 401/52

[56] References Cited
UNITED STATES PATENTS

| | | | |
|---|---|---|---|
| 582,612 | 5/1897 | Barrie | 15/221 |
| 1,748,008 | 2/1930 | Barnowitz | 15/244 C UX |
| 2,188,544 | 1/1940 | Scott | 15/105 X |
| 2,190,376 | 2/1940 | Daley | 15/244 C |
| 2,228,493 | 1/1941 | Will | 211/69 UX |
| 2,303,759 | 12/1942 | Pippin | 15/244 C |
| 2,842,791 | 7/1958 | Statler | 15/209 R |
| 3,068,545 | 12/1962 | Stiner | 15/244 B |
| 3,110,917 | 11/1963 | McPeek | 15/118 |
| 3,262,145 | 7/1966 | Carlson | 15/244 R |
| 3,367,483 | 2/1968 | Studen | 211/69 X |
| 3,458,268 | 7/1969 | Wozab et al. | 15/244 R X |
| 3,707,012 | 12/1972 | Lane | 15/244 C X |
| 3,717,898 | 2/1973 | Jones | 15/244 R |

FOREIGN PATENTS OR APPLICATIONS

| | | | |
|---|---|---|---|
| 1,943,110 | 5/1971 | Germany | 15/244 R |
| 943,711 | 12/1963 | Great Britain | 15/244 R |
| 1,543,656 | 9/1968 | France | 15/209 R |

*Primary Examiner*—Daniel Blum
*Attorney, Agent, or Firm*—Gary, Juettner, Pigott & Cullinan

[57] ABSTRACT

An improved eraser having excellent wiping and wear qualities is composed entirely or principally of a cellular thermoplastic foam, preferably of expanded, closed-cell polyethylene foam, with the erasing surface being abraded or otherwise treated to form open and feathered cells at the surface. The eraser is of a one piece solid construction with an integrally formed handle which protects the fingernails of the user. The sides of the eraser are beveled to minimize flipping during use. The eraser is formed by passage of the expanded plastic foam stock material through a heated wire form, which cuts the material to the desired form and also provides a fused, impervious skin of plastic material over the eraser body. The erasing surface is then cut, roughened, abraded, or otherwise similarly treated to impart the desired wiping and erasing qualities thereto.

5 Claims, 5 Drawing Figures

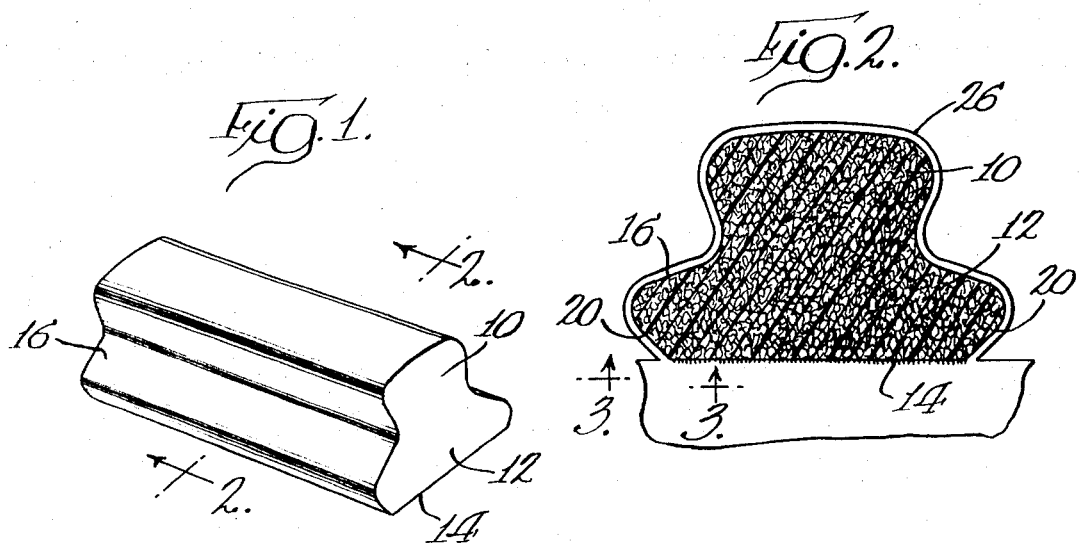

CHALK ERASER MADE FROM CLOSED CELL FOAM PLASTIC

BACKGROUND OF THE INVENTION

Erasers known in the prior art or in present commercial use suffer many disadvantages, primarily due to the design and to the materials from which such erasers are constructed. The most prevalent type is constructed from felt strips, which are bound to a rigid handle. When used, the felt eraser becomes clogged or saturated with chalk dust, thereby necessitating frequent cleaning. The cleaning may be accomplished by beating, but this dispels large quantities of chalk dust into the air. For this reason, many institutions resort to the use of special cleaning machines, which are expensive to purchase, require janitor time to operate, are subject to deterioration and require periodic maintenance and repair.

Conventional felt erasers are also considered objectionable because the flet may become matted after prolonged use, which results in greatly reduced erasing efficiency. The high porosity of the felt also allows absorption of liquids which may carry bacteria and viruses.

Other types of erasers are made of foam-backed chamois and porous polyurethane foam. Chamois is expensive and is prone to deterioration and rapid caking with chalk dust. Polyurethane foam is an open-cell, highly porous material that is easily saturated by chalk dust and deteriorates upon exposure to body oils and perspiration. Moreover, such urethane foams lack sufficient rigidity to remove heavy chalk marks, and a separate rigid handle must be attached to the foam body, which greatly increases the cost of the eraser.

SUMMARY OF THE INVENTION

The present invention resides in the discovery that certain closed-cell thermoplastic foams, when properly treated, display excellent erasing qualities and are not subject to the difficulties and problems inherent in erasers constructed from felt, chamois or polyurethane foam. The thermoplastic foam employed herein has sufficient structural rigidity to enable erasers to be prepared therefrom without resorting to the use of separate rigid handles or other reinforcing elements. The erasing surface is abraded or roughened to open the cells therein, which does not increase the porosity of the remainder of the eraser body. During use, the erasing surface is constantly renewed as the surface becomes progressively worn. Chalk dust does not penetrate into the body of the eraser but instead, falls into the chalk tray as the eraser is being used.

The thermoplastic foam material employed herein is light in weight, economical to use and is nonporous or impervious to moisture and oils from the skin. The body of the eraser is also constructed to protect the fingertips and nails of the user, and the sides of the erasing surface are beveled or rounded to minimize the problem of flipping or skipping.

The eraser body is formed by cutting the thermoplastic foam stock material with a hot wire, which seals the surfaces of the eraser body with a covering of fused thermoplastic. The erasing surface is then roughened or abraded to provide a semiporous surface that exhibits excellent erasing properties, freedom from caking and durability.

Other numerous advantages of the invention will become apparent from the following description and claims, taken in connection with the accompanying drawings.

THE DRAWINGS

FIG. 1 is a perspective view of the eraser of the present invention;

FIG. 2 is a cross sectional view taken along section line 2—2 of FIG. 1 and additionally showing a heated wire that is employed in fabricating the eraser;

FIG. 3 is a fragmentary view of the bottom of the eraser taken substantially along line 3—3 of FIG. 2 and illustrating a portion of the erasing surface and an adjacent beveled edge surface;

FIG. 4 is a perspective view of another form of the eraser of the present invention; and FIG. 5 is a perspective view of an additional form of the eraser that includes means for retaining a piece of chalk.

DESCRIPTION OF THE PREFERRED EMBODIMENTS

As shown in FIGS. 1–3, the eraser is preferably constructed from a single homogeneous component and is devoid of any separate rigid handles or reinforcing materials. The body of the eraser is of a unitary construction and is formed to include an upper rounded handle portion 10 and a lower body portion 12 having an outwardly facing flat planar erasing surface 14.

The entire eraser is preferably composed of an expanded, closed cell polyethylene foam having a sufficiently high density to retain structural rigidity under normal use. The polyethylene foam may be purchased in the form of planks and processed into the form of erasers, as will be hereinafter described. The material is sold by the Dow Chemical Company under the trademark "Ethafoam", and is a resilient, light weight material that will substantially return to its original shape when deformed.

As non-fully equivalent alternatives, other cellular thermoplastic foam materials may be employed in construction of the eraser described. Such other materials include foams having properties similar to the aforesaid closed cell polyethylene foam and include foams composed of polyolefin and vinyl polymers and copolymers, including polyethylene, polypropylene, polyvinylchloride and mixtures thereof, as well as polyethylene or polypropylene modified with polyisobutylene or other rubber compound, ethylene-propylene copolymers, and ethylene-vinyl acetate copolymers. Such materials are preferably of the closed cell type to inhibit saturation with chalk dust, although certain semiflexible open cell foams having characteristics similar to closed cell foams may be employed. The foams employed must be sufficiently rigid to retain the integrity of the shape of the eraser and to provide a structure that may be grasped and handled on the order of a conventional eraser.

The longitudinal handle portion 10 is preferably shaped so as to be narrower than the body portion 12, with a protective longitudinal shoulder 16 being provided on both sides of the handle and contiguous therewith. The shoulder 16 serves to prevent accidental contact between the fingers and fingernails and the blackboard as the eraser is being used. In the alternative as shown in FIGS. 4 and 5, the handle portion 10a may be substantially the same width as the body portion 12a and a central longitudinal groove 18 may be provided in both sides of the eraser coextensive with the length thereof to afford protection for the fingers of the user when the eraser is in use.

As mentioned, the foam material employed in the construction of the eraser is normally of the closed cell type and is substantially non-porous. The erasing surface 14, however, is preferably treated so as to be slightly porous or absorptive, and the resinous cell walls are feathered or serrated by abrasion to enhance the wiping or erasing qualities of the material. This effect may be accomplished by first sawing or cold cutting the material at the erasing surface, which cuts through the cellular structure and exposes a large number of closely spaced open cells or pores, which serves to collect chalk dust as the eraser is used. The erasing surface is also then preferably abraded or roughened such as with fine grained sand paper to soften the surface and to create feathered tufts thereon.

As a result of the above or an equivalent treatment, a thin opened cell erasing surface having soft feathered tufts is achieved, and the erasing surface overlays and is contiguous with the substantially non-porous body of the eraser. The tufts serve to remove the chalk marks and the limited depth pores serve to temporarily collect the chalk dust and carry it along with the eraser.

Because of the limited depth of the pores, chalk dust does not become embedded in the body of the eraser and is not held tightly in the porous surface. Thus, the erasing surface is essentially self-cleaning and does not accumulate substantial amounts of dust, which is problematic with felt erasers. The dust which does accumulate with each use tends to fall out of the eraser after it is placed in the chalk tray or when the eraser is flexed. Since the eraser body is incapable of accumulating and becoming saturated with chalk dust, the erasing efficiency over a period of usage is greatly enhanced.

An important feature of this invention is that repeated use of the eraser does not damage, deteriorate or destroy the erasing surface and does not adversely affect erasing qualities. As the eraser is used and the erasing surface becomes slightly worn, new cells are opened and exposed and new tufts are created by the abrasive action with the blackboard, such that the erasing surface is continuously renewed.

As shown in FIGS. 2 and 3, the sides 20 of the eraser body adjacent to the erasing surface are beveled or slanted upward. The beveled sides are preferably roughened similar to the erasing surface but also may remain untreated so as to be non-porous. This feature minimizes the tendency of the eraser to flip over and become jarred from the hand during use.

As shown in FIG. 5, one surface of the eraser, preferably at the top of the handle portion, may be provided with an open longitudinal groove 22 of a width slightly smaller than the diameter of a stick of chalk 24, such that the chalk may be inserted and held or retained in the groove as a convenient storage location.

The eraser herein described may be conveniently and easily manufactured by the following process, which also imparts some additional desirable properties to the structure. The body of the eraser is cut from a long piece of thermoplastic foam by use of a heated cutting means, such as a resistance wire heated by electrical current as shown in simplified fashion at 26 in FIG. 2. The wire is shaped in the desired final cross-sectional configuration of the eraser body, and the material is pushed lightly against the wire, thereby cutting the material to the desired shape. The resulting product is a rail of foam having the desired cross section, and the rail may then be divided into sections of desired eraser length.

A beneficial result of the hot wire method of manufacture is the formation of a fused skin or layer on the cut surfaces, which imparts an impervious substantially smooth, and lustrous finish to the handle and body portion and enhances the useful life of the eraser.

After formation of the body, the bottom surface is treated as hereinbefore described to produce a flat erasing surface, comprising closely spaced pores and feathered tufts.

It will be appreciated and obvious to those skilled in the art that various modifications in shape, appearance and design may be made to the improved eraser described herein without departing from the scope and the spirit of the present invention as expressed in the appended claims.

We claim:

1. An improved eraser for erasing chalkboards comprising an eraser body having a substantially flat and continuous erasing surface, said eraser being composed of substantially rigid expanded, closed cell, non-porous thermoplastic foam material, a longitudinal recess in each side of said body to protect the fingers of a user, said body including a section in the form of an integral handle, said handle having a fused plastic skin on at least a major portion thereof, opposite edges of said erasing surface being beveled, and said material on said erasing surface being abraided and feathered and exposing open cells in said surface contiguous with said closed cell body, whereby the open cells collect chalk dust without penetration of said dust into the body of the eraser.

2. The eraser of claim 1 wherein said handle is narrower than the remainder of said body and defines a shoulder with said body for protection of the fingers of a user thereof.

3. The invention according to claim 1 wherein said body is provided with an open longitudinal groove for receiving and gripping a piece of chalk.

4. The invention according to claim 1 wherein said plastic foam is expanded polyethylene.

5. The invention according to claim 1 wherein said plastic foam is selected from a group of foam materials consisting of polyethylene, polypropylene, polyvinylchloride, rubber-modified polyethylene, ethylene-propylene copolymers, ethylene-vinyl acetate copolymers and mixtures thereof.

* * * * *